(12) United States Patent
Pan et al.

(10) Patent No.: US 12,306,067 B2
(45) Date of Patent: May 20, 2025

(54) AIR LEAK DETECTION DEVICE, AIR LEAK DETECTION METHOD AND SYSTEM THEREOF

(71) Applicant: Wistron Corporation, New Taipei (TW)

(72) Inventors: Li-Ping Pan, New Taipei (TW); Xiao Qin Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 465 days.

(21) Appl. No.: 17/892,158

(22) Filed: Aug. 22, 2022

(65) Prior Publication Data

US 2023/0314263 A1 Oct. 5, 2023

(30) Foreign Application Priority Data

Apr. 1, 2022 (TW) .................................. 111112734

(51) Int. Cl.
*G01M 3/16* (2006.01)
(52) U.S. Cl.
CPC ..................................... *G01M 3/16* (2013.01)

(58) Field of Classification Search
None
See application file for complete search history.

(56) References Cited

U.S. PATENT DOCUMENTS

| | | | |
|---|---|---|---|
| 9,995,647 B2 * | 6/2018 | Huseynov | G01M 3/24 |
| 10,001,427 B2 * | 6/2018 | Augusto | G01N 21/3504 |
| 12,085,482 B2 * | 9/2024 | Forestelli | G01M 3/207 |
| 2016/0209293 A1 * | 7/2016 | Luemkemann | G01M 3/24 |
| 2024/0167744 A1 * | 5/2024 | Nishimura | F24F 11/36 |

FOREIGN PATENT DOCUMENTS

| | | | | |
|---|---|---|---|---|
| CN | 104515659 A | | 4/2015 | |
| CN | 106482912 A | * | 3/2017 | G01M 3/24 |
| CN | 109005494 A | | 12/2018 | |
| CN | 111551320 A | * | 8/2020 | G01M 3/24 |

* cited by examiner

*Primary Examiner* — Peter J Macchiarolo
*Assistant Examiner* — Jermaine L Jenkins
(74) *Attorney, Agent, or Firm* — Winston Hsu

(57) ABSTRACT

An air leak detection device, air leak detection method and system thereof are provided. The air leak detection method is used for a cavity. The air leak detection method includes the following steps. A scanning signal is input into the cavity. A response signal of the cavity related to the scanning signal is recorded. The response signal is analyzed to determine whether the cavity is air leaking.

17 Claims, 8 Drawing Sheets

AIR LEAK DETECTION DEVICE, AIR LEAK DETECTION METHOD AND SYSTEM THEREOF

BACKGROUND OF THE INVENTION

1. Field of the Invention

The present invention relates to an air leak detection device, an air leak detection method and a system thereof, and more particularly, relates to an air leak detection device, an air leak detection method and a system thereof for using an impedance curve to detect air leak.

2. Description of the Prior Art

The performance of an audio depends on a speaker driver and the design of a cabinet. For example, it is a mainstream design to embed a speaker driver in a sealed cabinet. Due to the large air damping inside the sealed cabinet, the response speed of the speaker driver is improved, such that the low-frequency sound performance is cleaner and clearer. However, once the sealed cabinet leaks air, the low-frequency response becomes worse, and noise (such as airflow sound) is produced. In general, engineers may use a stethoscope to check whether there is any noise, i.e. airflow sound, so as to detect whether the sealed cabinet is air leaking. On the other hand, engineers may put the audio into an air pressure chamber device, and detect whether the sealed cabinet is air leaking by detecting the change of air pressure in the air pressure chamber. However, the above methods have many disadvantages, such as high labor cost or equipment cost, lengthy detection process and extreme detection deviation value.

Under this circumstance, how to effectively carry out the air leak detection of sealed cabinet has become one of the goals in the industry.

SUMMARY OF THE INVENTION

The present invention is to provide an air leak detection device, an air leak detection method and a system thereof to solve the above problems.

An embodiment of the present invention provides an air leak detection method, used for a cavity, including steps of inputting a scanning signal into the cavity; recording a response signal of the cavity related to the scanning signal; and analyzing the response signal to determine whether the cavity is air leaking.

An embodiment of the present invention provides an air leak detection device, used for a cavity, including a signal generator, a receiver, a storage, and a processor. The signal generator is configured to input a scanning signal into the cavity. The receiver is configured to receive a response signal of the cavity related to the scanning signal. The storage is configured to record the response signal. The processor is configured to analyze the response signal to determine whether the cavity is air leaking.

An embodiment of the present invention provides an air leak detection system, including a cavity and an air leak detection device. The air leak detection device is coupled to the cavity and configured to input a scanning signal into the cavity, record a response signal of the cavity related to the scanning signal, and analyze the response signal to determine whether the cavity is air leaking.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
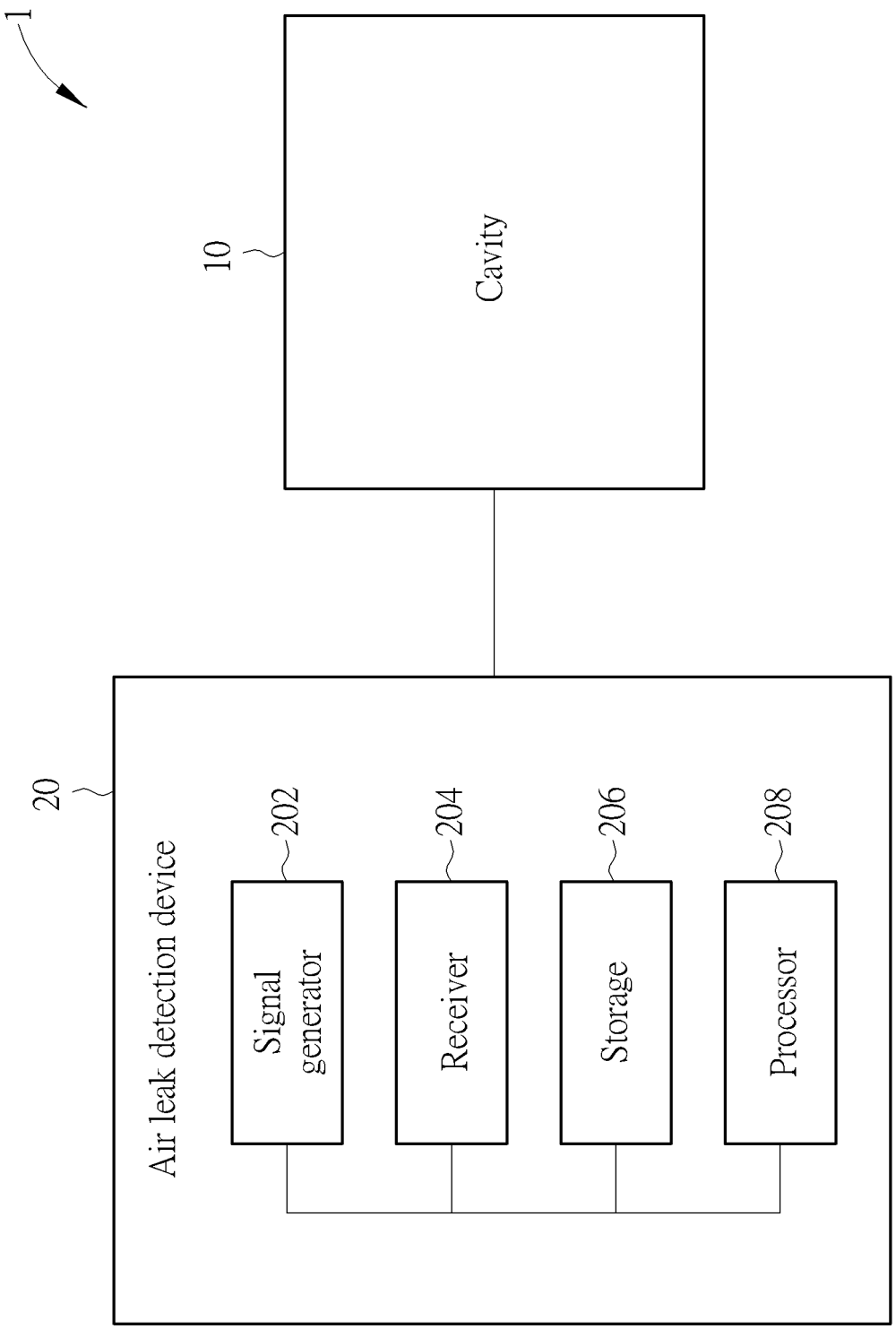
FIG. 1 is a schematic diagram of an air leak detection system according to an embodiment of the present invention.

Please refer to FIG. 1. FIG. 1 is a schematic diagram of an air leak detection system 1 according to an embodiment of the present invention. The air leak detection system 1 includes a cavity 10 and an air leak detection device 20. The cavity 10 is a closed case body, such as a sealed cabinet of an audio, a sealed engine of a car, etc. The air leak detection device 20 is coupled to the cavity, and is used for determining whether the cavity 10 is air leaking. The air leak detection device 20 includes a signal generator 202, a receiver 204, a storage 206, and a processor 208. The processor 208 is coupled to the signal generator 202, the receiver 204 and the storage 206. The storage 206 stores a program code for instructing the processor 208 to execute an air leak detection method to determine whether the cavity 10 is air leaking. It should be noted that the air leak detection device 20 merely represents the necessary components for executing the air leak detection method, and its basic structure is well known in the art and will not be repeated herein.

Those skilled in the art may add other components as needed, such as computers, screens, connecting cables, input devices, etc.

Figure 2:
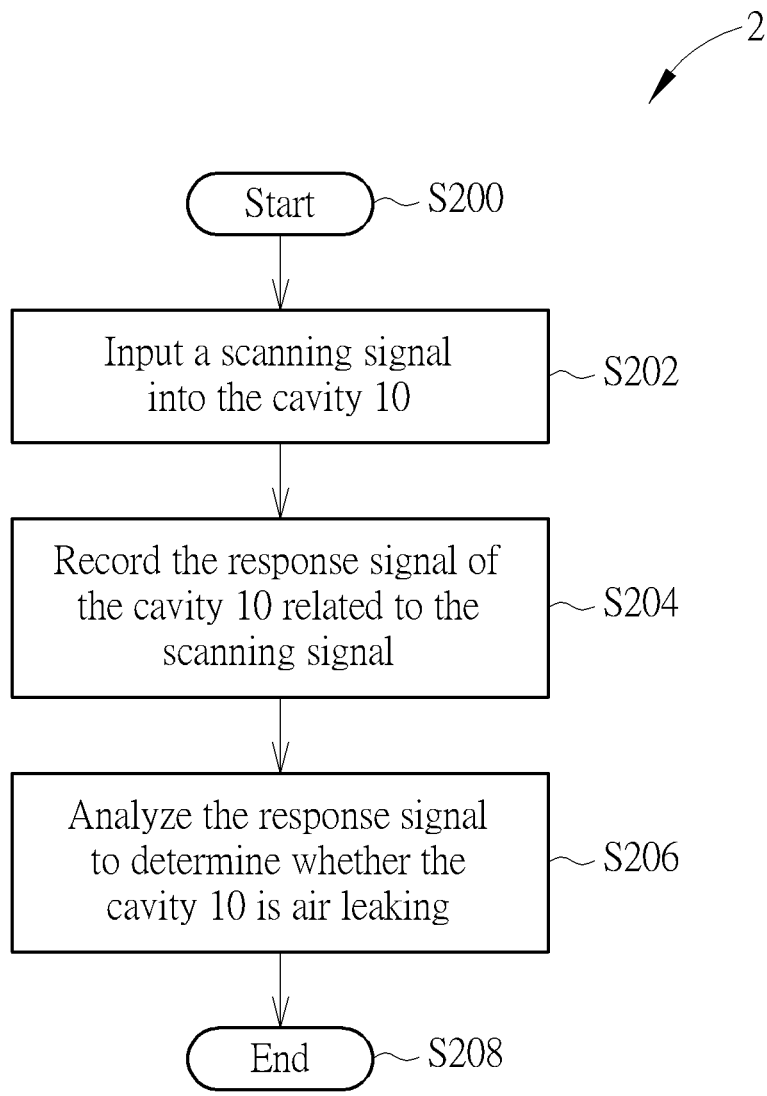
FIG. 2 is a flowchart of a process of an air leak detection method according to the embodiment of the present invention.

The air leak detection method of the air leak detection device 20 may be summarized as a process 2, as shown in FIG. 2. The process 2 includes the following steps:

Step S200: Start.

Step S202: Input a scanning signal into the cavity 10.

Step S204: Record the response signal of the cavity 10 related to the scanning signal.

Step S206: Analyze the response signal to determine whether the cavity 10 is air leaking.

Step S208: End.

According to the process 2, the signal generator 202 generates a scanning signal and inputs the scanning signal into the cavity 10. The receiver 204 receives a response signal of the cavity 10 related to the scanning signal. Finally, the processor 208 analyzes the response signal to determine whether the cavity 10 leaks air. In other words, the air leak detection method of the present invention determines whether the cavity 10 is air leaking by outputting the scanning signal and analyzing the response signal related to the scanning signal. In this way, not only labor cost and equipment cost may be reduced, but the detection speed and the detection accuracy may also be increased.

Figure 3:
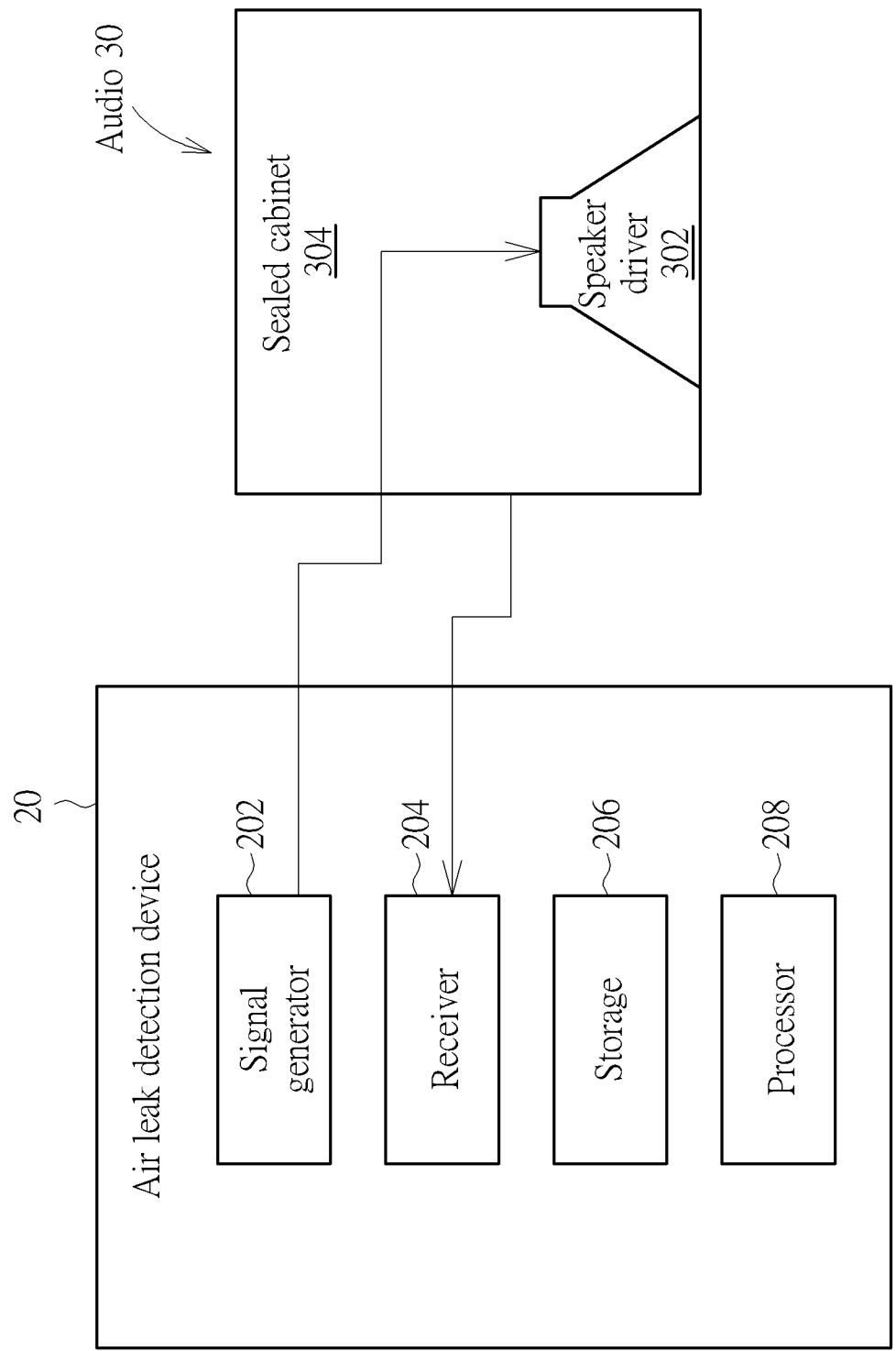
FIG. 3 is a schematic diagram of an air leak detection device for detecting an audio according to an embodiment of the present invention.

In order to clearly illustrate the operation of the air leak detection device 20 and the process 2, the following, in conjunction with FIG. 3, illustrates an example that the air leak detection device 20 detects an audio 30; that is, the cavity 10 is realized by the audio 30. As shown in FIG. 3, the air leak detection device 20 is coupled to the audio 30, and the audio 30 includes a speaker driver 302 embedded in a sealed cabinet 304. According to the process 2, in Step S202, the signal generator 202 generates a scanning signal and inputs the scanning signal into the audio 30. The scanning signal generated by the signal generator 202 may be a sine wave scanning signal, and a frequency range of the sine wave scanning signal may be 20-2 k Hz. When the sine wave scanning signal is input to the speaker driver 302, the speaker driver 302 outputs sound waves corresponding to the frequency range of the sine wave scanning signal. In should be noted that 20-2 k Hz represents the frequency range of the sine wave scanning signal that the speaker driver 302 may output in this embodiment, but is not limited thereto. Those skilled in the art may appropriately select the frequency range, and a plurality of sampling frequencies and a sampling precision within the frequency range according to requirements.

In Step S204, the receiver 204 receives a response signal of the audio 30 related to the scanning signal. In an embodiment, the air leak detection system 1 may further include a detector. When the speaker driver 302 outputs the sound waves corresponding to the frequency range, the detector may detect the sound waves transmitted in the sealed cabinet 304 and generate the response signal corresponding to the frequency range. The receiver 204 receives the response signal, and the response signal is recorded in the storage 206.

In Step S206, the processor 208 analyzes the response signal to determine whether the audio 30 leaks air. In an embodiment, the processor 208 calculates a plurality of impedances of the audio 30 corresponding to a plurality of sampling frequencies according to the response signal corresponding to the frequency range, and obtains an impedance curve according to the plurality of impedances. Furthermore, the processor 208 obtains an impedance peak value at a resonance frequency according to the impedance curve. When the impedance peak value is greater than a threshold, the audio 30 is determined to be not air leaking, and when the impedance peak value is smaller than the threshold, the audio 30 is determined to be air leaking. For example, the following Table 1 illustrates an embodiment of the present invention for the air leak detection device 20 to detect the plurality of impedances (Ohm) of a plurality of audios to be detected. The signal generator 202 generates the sine wave scanning signal with the frequency range of 280-450 Hz, and inputs the sine wave scanning signal into the audio to be detected. The receiver 204 receives the response signal corresponding to the frequency range of 280-450 Hz and records the response signal in the storage 206. The processor 208 calculates the plurality of impedances corresponding to the plurality of sampling frequencies of the plurality of audios to be detected according to the response signal corresponding to the frequency range of 280-450 Hz. As shown in Table 1, when the sine wave scanning signal with the sampling frequency of 280 Hz is input to audio I, the processor 208 calculates the impedance of audio I corresponding to 280 Hz as 7.35 Ohm according to the response signal corresponding to 280 Hz. Similarly, the impedance of audio V corresponding to 335 Hz is 10.15 Ohm.

TABLE 1

| Audio to be detected | Sampling frequency (Hz) | | | | | | | | |
|---|---|---|---|---|---|---|---|---|---|
| | 280 | 300 | 315 | 335 | 355 | 375 | 400 | 425 | 450 |
| Audio I | 7.35 | 7.81 | 8.1 | 8.37 | 8.48 | 8.42 | 8.14 | 7.72 | 4.26 |
| Audio II | 7.99 | 8.54 | 8.86 | 9.08 | 9.05 | 8.79 | 8.29 | 7.7 | 7.14 |
| Audio III | 8.71 | 9.4 | 9.76 | 9.94 | 9.75 | 9.3 | 8.55 | 7.81 | 7.17 |
| Audio IV | 7.18 | 7.62 | 7.9 | 8.19 | 8.31 | 8.26 | 7.99 | 7.59 | 7.13 |
| Audio V | 8.95 | 9.65 | 10 | 10.15 | 9.91 | 9.4 | 8.62 | 7.85 | 7.19 |

On the other hand, an impedance curve maybe obtained according to the plurality of impedances in Table 1. The processor 208 calculates and obtains that the impedance peak value of the impedance curve of audio I at the resonance frequency of 355 Hz is 8.48 Ohm, and the impedance peak value of the impedance curve of audio V at resonance frequency of 335 Hz is 10.15 Ohm. In an embodiment, when the impedance peak value of the audio to be detected is greater than the threshold, the audio to be detected is determined to be not air leaking, and when the impedance peak value of the audio to be detected is smaller than the threshold, the audio to be detected is determined to be air leaking. For example, please refer to FIG. 4A and FIG. 4B, which are schematic diagrams of impedance curves corresponding to audio V and audio I according to an embodiment of the present invention. The impedance peak value of audio V is 10.15 Ohm, which is greater than the threshold of 8.5 Ohm. Therefore, audio V is determined to be not air leaking. The impedance peak value of audio I is 8.48 Ohm, which is smaller than the threshold of 8.5 Ohm. Therefore, audio I is determined to be air leaking, and the cause of the air leak of audio I may be further detected. For example, a screw of audio I may not be locked tightly, and an output hole of audio I may not be properly glued, causing the sealed cabinet thereof to have air leaking holes and sealed foam assembled in the sealed cabinet to have gaps, etc.

Figure 4A:
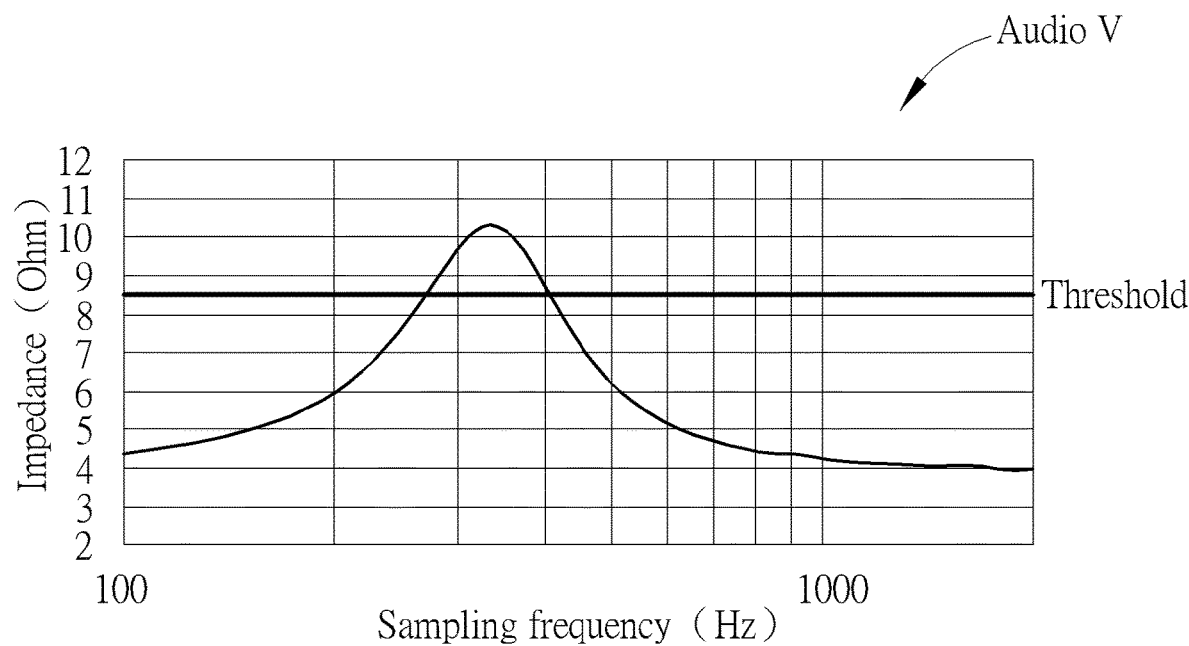
FIG. 4A is a schematic diagram of an impedance curve corresponding to audio V according to an embodiment of the present invention.
Figure 4B:
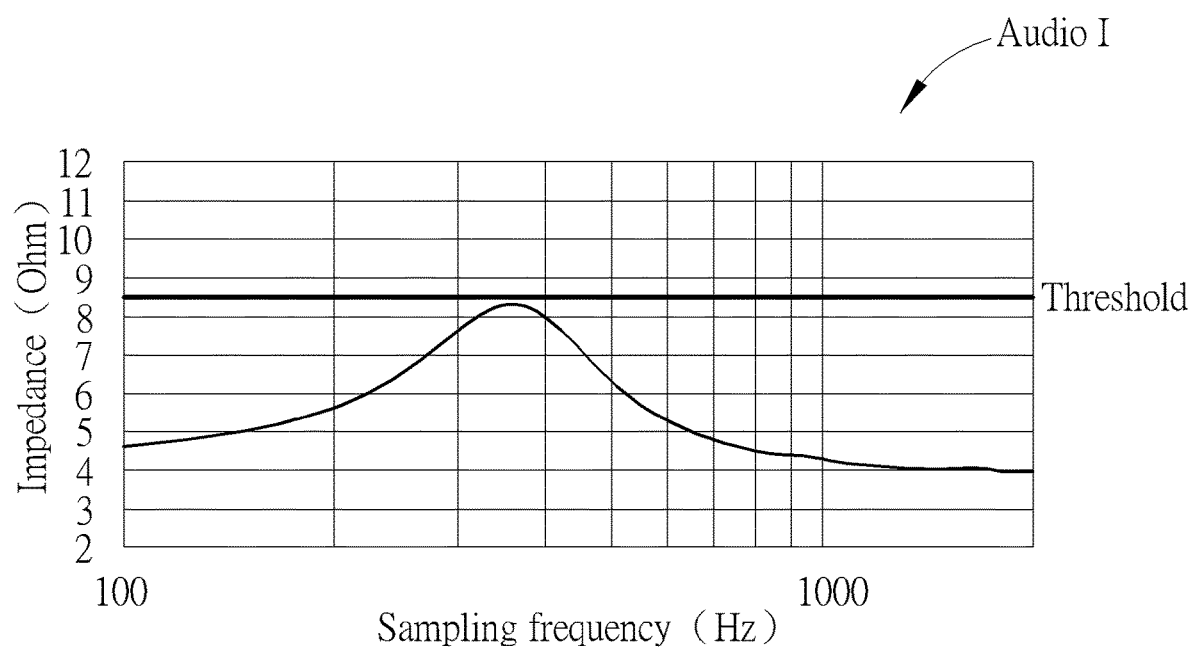
FIG. 4B is a schematic diagram of an impedance curve corresponding to audio I according to an embodiment of the present invention.
Figure 5:
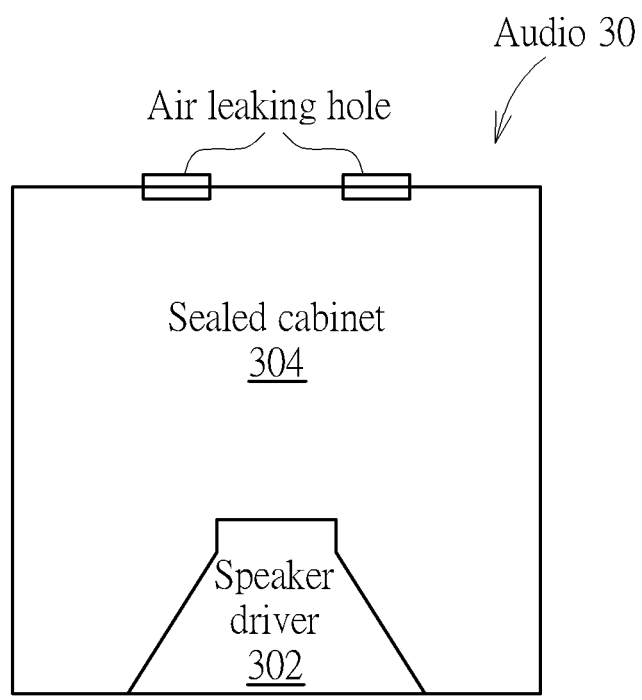
FIG. 5 is a schematic diagram of an audio according to an embodiment of the present invention.
Figure 6:
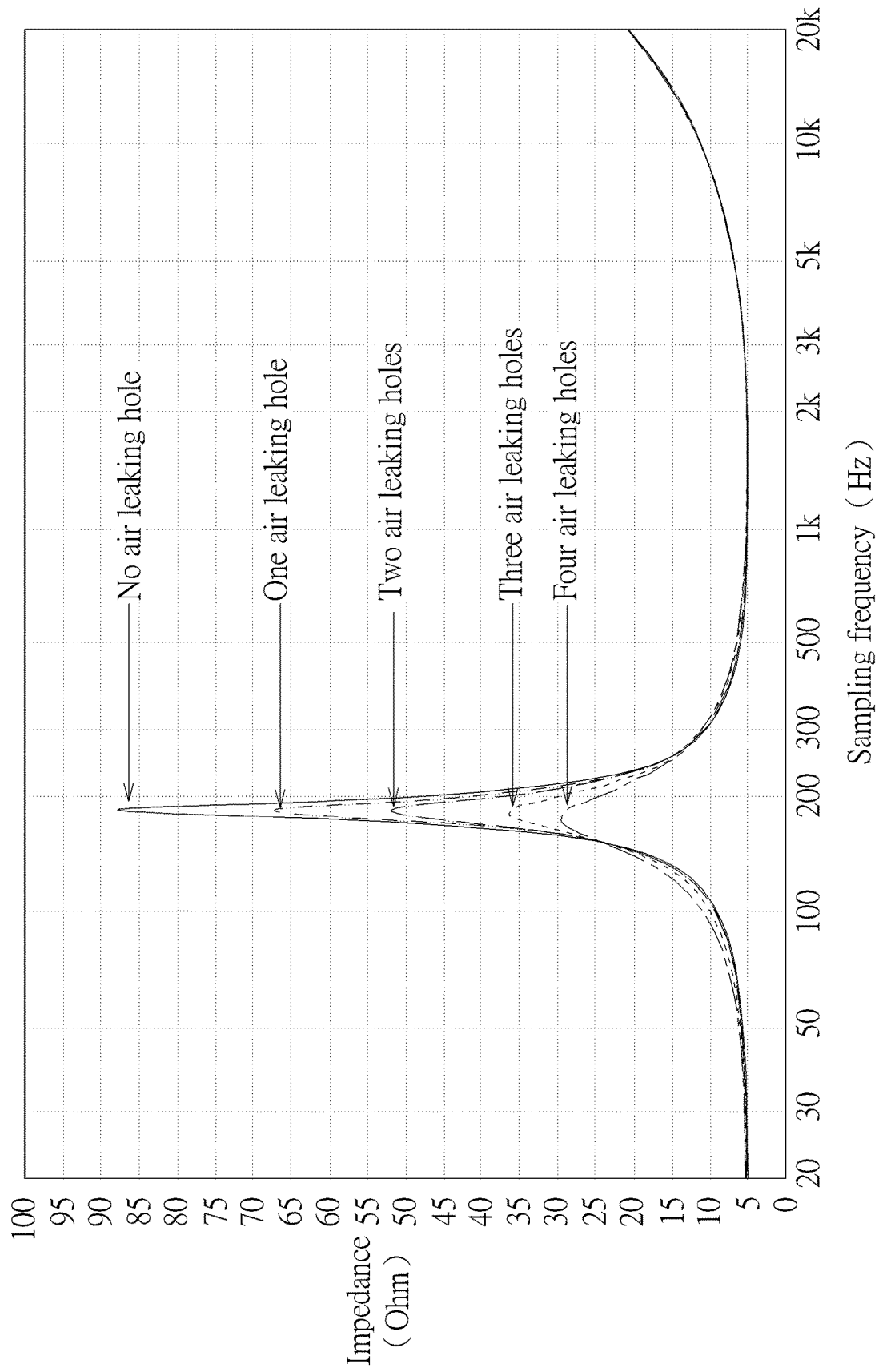
FIG. 6 is a schematic diagram of impedance curves of a sealed cabinet with different numbers of air leaking holes according to an embodiment of the present invention.

It can be seen from Table 1, FIG. 4A and FIG. 4B that different audios have different impedance peak values, and the impedance peak values are related to whether the audios are air leaking. Therefore, it is necessary to determine the impedance curve of the audio 30 first, so as to determine whether the audio 30 is air leaking. In an embodiment, as shown in FIG. 5, the sealed cabinet 304 maybe provided with a plurality of air leaking holes. It should be noted that, the sealed cabinet 304 in FIG. 5 only shows two air leaking holes as an example, but not limited thereto. The sealed cabinet 304 with no air leaking hole may be regarded as the sealed cabinet 304 is not air leaking, and the sealed cabinet 304 with air leaking holes may be regarded as the sealed cabinet 304 is air leaking. In addition, when the sealed cabinet 304 has more air leaking holes, air leaking is more serious. Please refer to FIG. 6. FIG. 6 is a schematic diagram of impedance curves of the sealed cabinet 304 with different numbers of air leaking holes according to an embodiment of the present invention. It is assumed that when the sealed cabinet 304 does not have any air leaking hole, the impedance peak value is 87 Ohm. When the sealed cabinet 304 is provided with one to four air leaking holes, the impedance peak values are 67 Ohm, 51 Ohm, 36 Ohm and 29 Ohm, respectively. In other words, as air leaking of the sealed cabinet 304 gets more serious, the impedance peak value is smaller. Therefore, a minimum allowable value of the impedance peak value may be set as the threshold, and when the impedance peak value is smaller than the minimum allowable value, the sealed cabinet 304 is determined to be air leaking.

Figure 7:
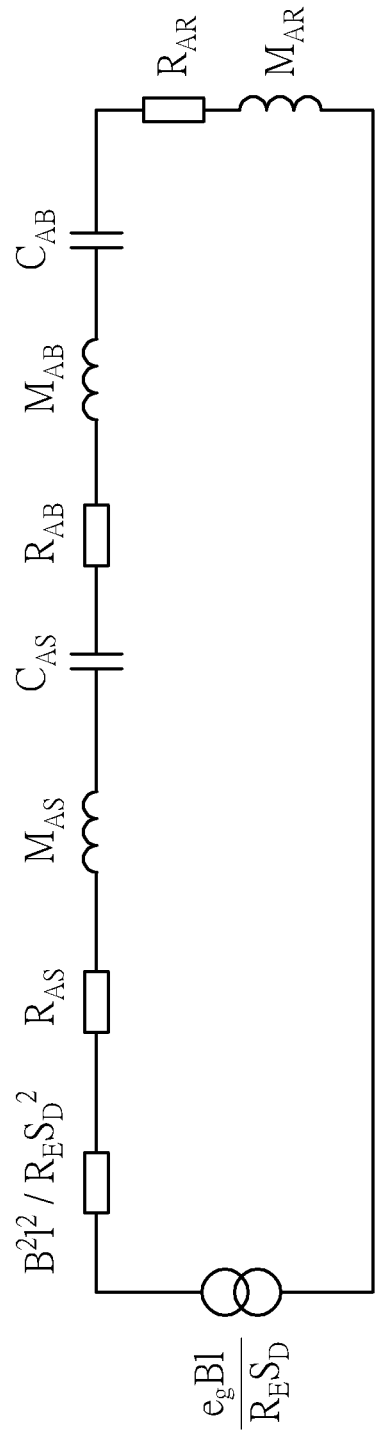
FIG. 7 is a schematic diagram of an equivalent circuit of an audio according to an embodiment of the present invention.

For the principle of using the impedance peak value of the audio 30 to determine whether the sealed cabinet 304 is air leaking, please refer to FIG. 7. FIG. 7 is a schematic diagram of an equivalent circuit of the audio 30 according to an embodiment of the present invention. The parameters in FIG. 7 are described in the following Table 2:

TABLE 2

| | |
|---|---|
| $e_g$ | Electromotive force of signal generator |
| Bl | Magnetic flux density |
| $R_E$ | Sum of internal resistance of signal generator and DC resistance of voice coil |
| $S_D$ | Vibration area of speaker driver |
| $R_{AS}$ | Acoustic resistance of support system of speaker driver |
| $M_{AS}$ | Sound quality of vibration system of speaker driver |
| $C_{AS}$ | Sound compliance of branch system of speaker driver |
| $R_{AB}$ | Rear acoustic resistance of speaker driver |
| $C_{AB}$ | Air compliance in sealed cabinet |
| $R_{AR}$ | Front radiation resistance and back radiation resistance |
| $M_{AR}$ | Sound quality |
| $M_{AB}$ | Sound quality in sealed cabinet |

It should be noted that the equivalent circuit of the audio 30 only lists equations of an impedance $Z_{AB}$ of the audio 30, a sound quality MAB in the sealed cabinet, and an air compliance CAB in the sealed cabinet, as shown in eq.(1) and eq.(2).

$$Z_{AB} = \omega M_{AB} - \frac{1}{\omega C_{AB}} \quad (1)$$

$$C_{AB} = \frac{V_B}{\rho_0 c_0^2} \quad (2)$$

Wherein $Z_{AB}$ is impedance, $M_{AB}$ is the sound quality in the sealed cabinet, $V_B$ is the volume of the sealed cabinet, $\rho_0$ is the air density, and $c_0$ is the air speed.

Specifically, the severity of air leak of the sealed cabinet 304 corresponds to variation of the volume of the sealed cabinet 304. Eq. (1) illustrates that the impedance $Z_{AB}$ changes with the air compliance CAB, and Eq. (2) illustrates that the air compliance CAB is affected when the volume V_B of the sealed cabinet changes. In other words, when air leak of the sealed cabinet 304 increases, the volume V_B of the sealed cabinet 304 and the air compliance $C_{AB}$ increase, and the impedance ZAB becomes smaller. Accordingly, the processor 208 calculates the plurality of impedances of the audio 30 corresponding to the plurality of sampling frequencies according to the response signal and obtains the impedance curve according to the plurality of impedances, and further obtains the impedance peak value at the resonance frequency, so as to determine whether the audio 30 is air leaking according to the impedance peak value.

Figure 8:
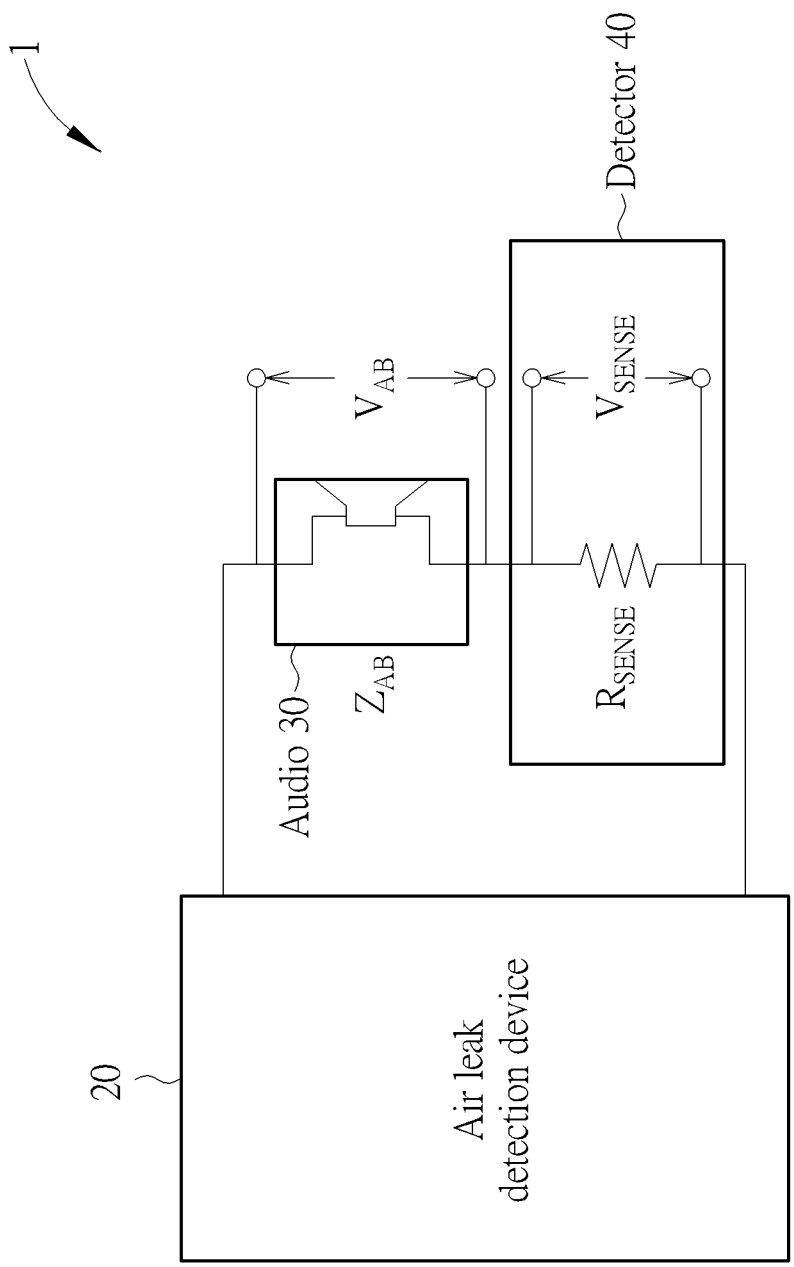
FIG. 8 is a schematic diagram of an air leak detection system according to another embodiment of the present invention.

In another embodiment, please refer to FIG. 8. FIG. 8 is a schematic diagram of the air leak detection system 1 according to an embodiment of the present invention. The air leak detection system 1 further includes a detector 40, and the detector 40 may be a voltmeter. The voltmeter includes a detect voltage $V_{SENSE}$ and a detect resistance $R_{SENSE}$. The voltmeter may detect the response signal corresponding to the frequency range of the audio 30, wherein the response signal is a voltage signal $V_{AB}$. According to Kirchhoff's circuit laws, the impedance $Z_{AB}$ may be calculated from Eq. (3):

$$\frac{Z_{AB}}{R_{SENSE}} = \frac{V_{AB}}{V_{SENSE}} \quad (3)$$

Wherein $V_{SENSE}$ is the detect voltage, $R_{SENSE}$ is the detect resistance, $V_{AB}$ is the voltage signal, and $Z_{AB}$ is the resistance.

In addition, the processor 208 calculates and obtains the impedance peak value of the impedance curve of the audio 30 at the resonance frequency, and compares the impedance peak value with the threshold to determine whether the audio 30 is air leaking.

It should be noted that the detector 40 may be the voltmeter, but is not limited thereto. For example, the detector 40 may be a galvanometer or a pressure meter. The galvanometer may detect the response signal in the form of a current signal, and the pressure meter may detect the response signal of a pressure signal. Accordingly, the processor 208 may calculate the impedance peak value according to the current signal or the pressure signal, and may compare the impedance peak value with the threshold to determine whether the audio 30 is air leaking.

Those skilled in the art should readily make combinations, modifications and/or alterations on the abovementioned description and examples. The abovementioned description, steps, procedures and/or processes including suggested steps may be realized by means that could be hardware, software, firmware (known as a combination of a hardware device and computer instructions and data that reside as read-only software on the hardware device), an electronic system, or combination thereof. Examples of hardware may include analog, digital and mixed circuits known as microcircuit, microchip, or silicon chip. Examples of the electronic system may include a system on chip (SoC), system in package (SiP), a computer on module (CoM) and the air leak detection system 1. Any of the abovementioned procedures and examples above may be compiled into program codes or instructions that are stored in the storage 206. The storage 206 may include read-only memory (ROM), flash memory, random access memory (RAM), subscriber identity module (SIM), hard disk, floppy diskette, or CD-ROM/DVD-ROM/BD-ROM, but not limited thereto. The processor 208 may read and execute the program codes or the instructions stored in the storage 206 for realizing the abovementioned functions.

In summary, in the prior art, the engineers use the stethoscope to check whether there is any noise such as the airflow sound in the audio to determine whether the sealed cabinet is air leaking, or put the audio into the air pressure chamber device, and detect whether the sealed cabinet is air leaking by detecting the change of air pressure in the air pressure chamber. Therefore, detecting whether the audio is air leaking in the prior art requires high labor cost, high equipment cost, lengthy detection process and has extreme detection deviation values. In comparison, the air leak detection method of the present invention may detect the impedance peak value of the audio at the resonance frequency, and compare the impedance peak value with the threshold to determine whether the audio is air leaking. In this way, not only labor cost and equipment cost may be reduced, but the detection speed and the detection accuracy may also be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An air leak detection method, used for a cavity, comprising:
   inputting, by a signal generator, a scanning signal into the cavity;
   recording, by a storage, a response signal of the cavity related to the scanning signal; and
   analyzing, by a processor, the response signal for determining whether the cavity is air leaking;
   wherein the step of analyzing the response signal for determining whether the cavity is air leaking comprises:
      calculating an impedance curve of the cavity according to the response signal; and
      comparing an impedance peak value of the impedance curve with a threshold to determine whether the cavity is air leaking.

2. The air leak detection method of claim 1, wherein the scanning signal is a sine wave scanning signal.

3. The air leak detection method of claim 2, wherein a frequency range of the sine wave scanning signal is between 20 Hz and 2 kHz.

4. The air leak detection method of claim 1, wherein the step of comparing the impedance peak value of the impedance curve with the threshold to determine whether the cavity is air leaking comprises:
   when the impedance peak value is greater than the threshold, determining that the cavity is not air leaking; and
   when the impedance peak value is less than the threshold, determining that the cavity is air leaking.

5. An air leak detection device, used for a cavity, comprising:
   a signal generator, configured to input a scanning signal into the cavity;
   a receiver, configured to receive a response signal of the cavity related to the scanning signal;
   a storage, configured to record the response signal; and
   a processor, coupled to the signal generator, the receiver and storage, configured to analyze the response signal to determine whether the cavity is air leaking;
   wherein the processor is configured to:
      analyze the response signal to calculate an impedance curve of the cavity, and
      compare an impedance peak value of the impedance curve with a threshold to determine whether the cavity is air leaking.

6. The air leak detection device of claim 5, wherein the scanning signal is a sine wave scanning signal.

7. The air leak detection device of claim 6, wherein a frequency range of the sine wave scanning signal is between 20 Hz and 2 kHz.

8. The air leak detection device of claim 5, wherein the cavity is a sealed cabinet of an audio.

9. The air leak detection device of claim 5, wherein the detector is a voltmeter, a galvanometer, or a pressure meter.

10. The air leak detection device of claim 5, wherein the larger a cavity volume of the cavity is, the smaller the impedance peak value is, and the smaller the cavity volume is, the larger the impedance peak value is.

11. The air leak detection device of claim 10, wherein when the impedance peak value is greater than the threshold, the cavity is determined to be not air leaking, and when the impedance peak value is less than the threshold, the cavity is determined to be air leaking.

12. An air leak detection system, comprising:
   a cavity; and
   an air leak detection device, coupled to the cavity, configured to input a scanning signal into the cavity, record a response signal of the cavity related to the scanning signal, and analyze the response signal to determine whether the cavity is air leaking;
   wherein the air leak detection device is configured to calculate an impedance curve of the cavity according to the response signal, and compare an impedance peak value of the impedance curve with a threshold to determine whether the cavity is air leaking.

13. The air leak detection device of claim 12, wherein the cavity is a sealed cabinet of an audio.

14. The air leak detection device of claim 12, wherein the air leak detection device comprises:
   a signal generator which inputs the scanning signal into the cavity;
   a receiver which receives the response signal of the cavity related to the scanning signal;
   a storage which records the response signal; and
   a processor which analyzes the response signal to determine whether the cavity is air leaking.

15. The air leak detection system of claim 12, wherein the air leak detection device is further configured to generate a sine wave scanning signal as the scanning signal.

16. The air leak detection system of claim 15, wherein a frequency range of the sine wave scanning signal is between 20 Hz and 2 kHz.

17. The air leak detection system of claim 12, wherein when the impedance peak value is greater than the threshold, the cavity is determined to be not air leaking, and when the impedance peak value is less than the threshold, the cavity is determined to be air leaking.

* * * * *